United States Patent [19]

Alldredge

[11] Patent Number: 4,910,676
[45] Date of Patent: Mar. 20, 1990

[54] PROCESSING SYSTEM FOR MANAGING BI-MEDIA INVESTMENTS

[76] Inventor: Robert L. Alldredge, 130 Pearl St., Denver, Colo. 80203

[21] Appl. No.: 31,590

[22] Filed: Mar. 30, 1987

[51] Int. Cl.$^4$ .............................................. G06F 15/30
[52] U.S. Cl. ..................................... 364/408; 364/900
[58] Field of Search ................ 364/406, 408; 235/379, 235/380, 381

[56] References Cited

U.S. PATENT DOCUMENTS

| | | | |
|---|---|---|---|
| 3,082,402 | 3/1963 | Scantlin | 364/408 X |
| 4,194,242 | 3/1980 | Robbins | 364/200 |
| 4,334,270 | 6/1982 | Towers | 364/408 |
| 4,346,442 | 8/1982 | Musmanno | 364/408 |
| 4,376,978 | 3/1983 | Musmano | 364/408 |
| 4,694,397 | 9/1987 | Grant et al. | 364/408 |

*Primary Examiner*—Jerry Smith
*Assistant Examiner*—Kimthanh Tbui
*Attorney, Agent, or Firm*—Kyle W. Rost

[57] ABSTRACT

A processing system manages investments, wherein certain types of investments are represented in two redundant media, the first media being an investment that produces revenue and the second media being a negotiable draft similar to a traveler's check, drawn against an issuer other than the investor. The processing system supervises the issuance of drafts in response to the addition of a first media investment to an investment account, permits issued drafts to be transferred between account holders and to non-holders, and supervises buy and sell orders relating to each account to ensure that an appropriate balance of values is maintained between the first and second media investments in each account such that each outstanding draft is supported by a first media investment. Provision is made for the system to collect a charge upon transfer or issue of a draft without degrading the value of the first media investment principal, and further provision is made for the owner or record of a draft to continue to benefit from the earnings of an associated value of first media investment even after transfer of the draft to another party under selected circumstances, such as when the new owner does not hold an investment account with the institution managing the account.

11 Claims, 6 Drawing Sheets

PROCESSING SYSTEM FOR MANAGING BI-MEDIA INVESTMENTS

BACKGROUND OF THE INVENTION

1. Field of the Invention

The invention relates to data processing systems and applications therof. More specifically, the invention relates to business practice and management and especially to finance, such as securities. Methods and systems are disclosed for the creation and management of predenominated negotiable drafts that, while unredeemed, provide investment-supporting capability to an owner of record.

2. Description of the Prior Art

Banks manage customer funds in various types of accounts, including traditional checking accounts in which the customer is entitled to write checks in amounts of the customer's selection and the bank determines at the time the check is presented for payment whether the check will be honored, which is a funtion of whether the customer has adequate credit or money on deposit with the bank. Accordingly, the term "check" is often understood to refer to a written order, usually on a standard printed form, directing a bank to pay money, in which the order is prepared by the bank customer or account holder. Because of the informality with which checks can be written, checks are considered to be short-term instruments, often being limited in negotiable life to six months, by custom or law.

Banks, express companies, and the like also provide drafts, which differ from checks in that a draft is drawn against the bank's own funds. Accordingly, a much higher degree of reliability surrounds a bank draft, as it is assured that the draft will be honored when presented and that sufficient funds are held for payment.

In order to provide to customers a more flexible credit arrangement, banks provide letters of credit, indicating the bank's willingness to pay upon demand a certain upper limit of funds on behalf of a customer.

Banks also provide "traveler's checks," which are pre-denominated drafts against the bank's funds, often requiring the purchaser's signature or duplicate signature in order to make the draft properly negotiable. Therefore, traveler's checks are very similar to bank drafts in that the bank has received the funds to support payment of the checks at the time the checks are issued to a customer. Such drafts provide a high degree of reliability and security to all holders, as they can be replaced if lost by the original purchaser, they do not become stale if held for long periods of time, and they are supported by the funds held by an institution that is charged with knowledge of their face value and outstanding amount.

Banking and securities institutions have created composite customer accounts in which the customer's funds are maintained in interest-earning accounts against which the customer's checks may be drawn. Further developments of this type of account have permitted customer funds to be invested in actual securities such as pooled income trusts. U.S. Pat. No. 4,346,442 to Musmanno discloses a system in which a customer's funds are held in a securities brokerage account for investment in a variety of securities, including money market accounts. The Musmanno system permits the customer to draw against the account by use of normal checks and charge cards, with the management system ordering the liquidation of the account in a preferred manner in order to satisfy transaction or check charges. Similarly, the management system orders the investment of incoming revenues in a preferred manner and monitors the customer's credit limit. Such a composite account offers improved management of funds with a potentially greater ready line-of-credit to the customer than would be available if the customer were to isolate bank functions from securities-brokerage functions.

The present invention offers a system of financial management in which the account holder's funds are placed in bi-media investments, including both a revenue producing investment and a non-revenue producing, negotiable draft type of investment, such that the customer's portfolio is substantially entirely invested in each of the two investment forms, as more fully explained in the following detailed description. To achieve the foregoing and other objects and in accordance with the purpose of the present invention, as embodied and broadly described herein, the system and method of account management of this invention may comprise the following.

SUMMARY OF THE INVENTION

Against the described background, it is therefore a general object of the invention to provide an improved management system for investments, wherein each investment is represented in two media, one of the media being revenue producing and the other being non-revenue producing.

Another object is to provide a financial management system that provides protection against loss or theft of the non-revenue producing investment media, while permitting such media to be alienated and circulated among subsequent holders for extended time periods.

A further object is to manage investment accounts in such a way that certain investments are identified as qualified for support of a second media representation, and to issue appropriate second media to the account holder.

A related object is to manage investment accounts to protect the backing or collateral behind the second media representations, such that the second media always is supported in its value to ensure that such media can be honored for redemption whenever presented for payment.

Additional objects, advantages and novel features of the invention shall be set forth in part in the description that follows, and in part will become apparent to those skilled in the art upon examination of the following or may be learned by the practice of the invention. The object and the advantages of the invention may be realized and attained by means of the instrumentalities and in combinations particularly pointed out in the appended claims.

According to the invention, a processing system for the management of financial and securities accounts provides for investments to be represented in two media, wherein the first media is a revenue generating investment having characteristics that qualify it for bi-media representation, and the second media is a negotiable draft investment drawn against an issuer other than the account holder. The system maintains account files for a plurality of investors having bi-media investments, each investor's account file containing current information identifying the bi-media investments of the account holder. One or more transaction entry means are provided for requesting that the system authorize investment transactions to an account file, one such transaction entry means being, for example, a data input terminal operated by the financial institution having the account files, and another type of transaction entry means being a data input terminal responsive to remote inputs, as from a telephone keypad. An investment transaction generating means is provided within the processing steps of the system for responding to the transaction entry means and initiating acquisition of a requested investment in the first media to the investment account file. Then, in order to create a bi-media investment that is at least partially redundant in value with the first media investment, the system includes a qualified investment identification means that is responsive to the transaction entry means for characterizing a requested investment addition to the investment account file as to qualified nature. The qualified investment identification function may be performed by the mere acceptance of a requested investment in a system that handles only fully qualified investments; by the selective identification of qualified investments in a system that responds to both qualified and non-qualified investments; by the identification and rating of qualified investments in a system that accepts various degrees of qualification; and by combinations of the above noted methods. In response to the qualified investment identification means, a second media investment generating means initiates the associated aquisition of the requested investment in the second media to the investment account file, to the degree that the requested investment has been determined to be qualified for bi-media treatment. A means for updating the investment account file then responds to the qualified investment identification means, the investment transaction generating means, and the second media investment generating means to show the bi-media nature of the requested investment.

A further aspect of the processing system differentiates between first and second media additions to the investment account, in response to inputs from the transaction entry means. A second media addition by transfer of a draft from a different investment account is responded to without issuing another draft, since each investment is represented only once in second media. When the processing system recognizes an addition to an investment account by addition of a previously issued draft, an earnings transfer indicating means may respond by indicating that the earnings of the associated first media investment are to be transferred to another account of the processing system for a limited, selected period of time. In this way, the costs of operating the bi-media system may be recovered at times that ownership of the second media investment is transferred, such as by directing a portion of the associated first media investment's earnings to the account of the financial institution or draft issuer. Accordingly, the earnings transfer indicating means also may operate when a first media investment is made to an account and new second media are authorized for original issue to the account holder.

Still another aspect of the processing system is that second media drafts may be alienated in title from the holder of the account without alienating the first media investment supporting the issuance of the second media investment. This result may be reached when the processing system detects via a draft title monitoring means that a draft is transferred or sold from an account without being redeemed or entered into another account within the sytem. As a practical result, the account holder continues to obtain the benefit of the bi-media investment despite the fact that one representation of the investment has been used to satisfy an outside obligation. At the same time, the system promotes and supports retention of a transferred draft by an outside party by limiting the alienability of an appropriate value of first media investment in the account holder's portfolio. In this regard, the nature of the second media investment as being a draft is important, because a draft in the nature of a traveler's check or similar instrument is undated and does not expire or become stale in the conventional manner associated with the checks of private individuals. While the second media is frequently referred to as being for "drafts," the nature of a draft is not limited to a printed or written bill, but may include electronic, magnetic, or other media.

The processing system also manages the redemption or liquidation of first media investments in response to the transaction generating means. The qualified investment identification means may respond to the transaction generating means by characterizing the investment as to qualified nature, and in response to such characterization, a non-negotiability indicating means may indicate on the account file that a coresonding value of second media investments in the file is non-negotiable.

The accompanying drawings, which are incorporated in and form a part of the specification illustrate preferred embodiments of the present invention, and together with the description, serve to explain the principles of the invention. In the drawings.

BRIEF DESCRIPTION OF THE DRAWINGS

DESCRIPTION OF THE PREFERRED EMBODIMENT

The present system for processing and supervising investment accounts is best understood against a general background of how a financial institution presently may manage an investment account. The term "financial institution" refers to a bank, an investment banker or securities broker, or a combination of such entities who serve their investor customers by placing the investor's money in an account, fund, security, or business activity that is expected to provide a benefit to the investor. Within the contemplated scope of a financial institution's activity are matters as simple as a bank's accepting deposits into a savings account and subsequently lending the investment funds at a higher rate of return in order to cover the interest obligation on the savings account. On the other hand, the more complex operation of various money market funds and pooled trusts managed through a variety of institutions such as insurance companies, mutual fund managers, banks, thrift institutions, and investment bankers also is included. The "investor" with the financial institution is an entity having an account, typically identified by an account number, in which the account entitles the investor to certain rights. Such rights may be, at the minimum, the right to transact business on a cash basis with the financial institution. In other instances, the right may include the conduct of credit transactions, such as through a margin brokerage account. 1

A financial institution may manage investor accounts by maintaining for each investor an individual account file showing transactions to the investment account. Periodically, such as daily, the account is updated to show transactions. The account file may include special instructions or pre-arranged investing schemes to provide for the automatic investment or liquidation of funds, which may include incoming revenues such as additions made by the investor or earnings from investments in the account. Account earnings, sale proceeds, other forms of incoming revenue, and new deposits by the investor may be referred to as "cash additions" to the account and are recognized at the times that the account file is updated. Cash additions may be applied first to pay debits against the account for fees of the financial institution, credit charges, interest charges on margin accounts, and the like, after which the balance of the cash addition may be deposited in a liquid, interest earning or dividend earning fund such as a money-market fund. A periodic statement is issued to the account holder showing all transactions since the last statement, including cash additions, debits, automatic payments into or out of a money market fund, the present net worth of all investments in the account file, and any loan balance or credit.

The present processing and supervisory system is best suited for use with investment account files that relate, at least in part, to liquid, revenue generating investments, which may be considered to be those investments that can be at least partially liquidated on a daily or other short term basis. Accordingly, investments such as savings accounts, money market funds, and pooled trusts are well suited for use with the system. A further desirable feature of this type of investment is that the principal balance generally is not subject to decline in value. A margin brokerage account or an account having a line of credit also is suited for use with the system, since credit may be extended within an established limit, such as a percent of security value, on a daily basis.

Certain types of investments that do not share the security and stability of the mentioned savings account, money market fund, or pooled trust also may be used within the discretion of the financial institution and the limits that may be established by regulatory bodies. Thus, stocks, bonds, options, and other investments commonly subject to fluctuations or not considered to be liquid on a daily basis may be supported within the system on a basis similar to that used in a margin brokerage account, wherein a specified percentage of the investment value is considered to be secure enough to support a loan.

The term "qualified" will be applied to those investment vehicles that have the requisite liquidity, safety of principal, or other characteristics such that a financial institution authorizes the use of such investment vehicle to support bi-media representation within the supervisory system, while other investment vehicles are termed "non-qualified."

The system creates and controls a bi-media investment from qualified investments of an investor's account, wherein the first media is a revenue generating, qualified investment such as money market shares, and the second media is a negotiable draft instrument issued by the financial institution or other associated entity who hereinafter will be called the "issuer." The investor's funds therefore are present in two forms, one being a revenue producing investment capable of generating interest, dividends, or other revenue, and the second being the draft of the issuer that may be transferred separately from the underlying qualified investment. Such draft is preferred to be pre-denominated in standard denominations, serial numbered for individual indentification, and transfer-protected by the requirement for an investor to grant authorization before the draft may be negotiated. A presently existing draft having these characteristics is the traveler's check, which requires a duplicate signature of the original owner before the traveler's check may be redeemed. The preferred draft may require additional features, such as that the investor's account number be recorded on the draft, and, in addition, each draft may be assigned a code number specific to the investor and to the specific draft belonging to the identified investor. The draft therefore constitutes a second media of the investment, fully alienable from the first media, with the issuer being responsible for payment. The supervisory system must assure that each draft is validated and backed by a suitable underlying investment so that the draft may be redeemed by the issuer and the cost recovered from the investment account of the investor owning the draft according to the records of the financial institution.

The supervisory system manages the investor account through the course of a variety of situations that broadly may be categorized as "buy" situations and "sell" situations. Within those two categories, "buy" situations might include both cash additions to the account and draft transfers into the account, ad "sell" situations might include the liquidation of a preexisting first media investment and the liquidation or redemption of a draft. These situations are managed during the routine periodic processing of investor accounts, such as on a daily listing and processing of transactions. In addition, the system provides a continuous supervisory function over all issued, outstanding drafts to enable the negotiability of any draft to be determined by telephone or other types of remote inquiry, and in certain instances, the system will report special status of a draft to the investor.

At the origination of many investor accounts and at various times subsequent thereto, a "buy" situation will arise by cash addition to the account. As a preliminary matter, therefore, the account may be assumed to have been established by assignment of an account number and entry of personal data regarding the investor. In addition, for purposes of the present system, the investor is provided with a confidential code number, other than the assigned account number, that is capable of identifying the investor and his account. The account also may contain standard investment instructions for handling any uncommitted cash balance, such as to immediately purchase a specified investment such as a money market fund with the cash balance.

Upon the receipt of a cash addition, the financial institution will enter relevant information into the system via a transaction entry means such as a computer terminal, and the system will call the investor's account file from the sytem data base, perform updating calculations, such as to determine any limitations on the transfer of investments, and then, via an investment transaction generating means responsive to the transaction entry means, review the information entered by the financial institution to determine the nature of the transaction that has been requested and whether the transaction is based upon a change in the status of first media or second media entries in the account file. Having determined, for example, that a "buy" order has been requested based upon a cash addition, the system will indicate execution of the "buy" order and then refer to a qualified investment identification means, such as a data file listing of qualified investment information in the data base, to determine whether and to what extent the requested investment is qualified for bi-media representation.

The purchase of a qualified investment will cause a second-media investment generating means within the system, responsive to a determination by the qualified investment identification means, to further determine from the investment account file whether an unused additional balance from previous qualified purchases is available to buy second-media investments, to increase the present balance by such amount, and to initiate the associated aquisition of the requested investment in the second media to the investment account file by selecting a draft or combination of drafts to be issued to the account holder within the available qualified balance. The system may follow special instructions in the account file regarding acceptable denominations of the issued drafts and return any remainder of the qualified balance as a carried-over "draft buy balance" on the account file. The selected drafts are indicated to be issued to the account holder and are the second media representation of the qualified investment; and then an updating means responsive to the qualified investment identification means, investment transaction generating means, and the second media investment generating means shows the bi-media nature of the requested investment by recording the draft serial or other identification numbers and denominations on the investor's account file together with certain limitations described below.

The operation and maintenance of the supervisory system with regard to the administration of the drafts may involve special costs to the financial institution, including compensation to the draft issuer and its agents and to draft redeeming agents. In addition, certain losses are expected by fraud or theft. By placing limited-term restrictions on the issued drafts and the underlying qualified investment, the financial institution may pay these and other costs of the system through the system itself, without imposing special commissions against the "buy" order. This may be accomplished, first, by coding the drafts at the time of issue in the data base file and investor file to be non-negotiable for a limited term, such as for a period of days. Second, the associated qualified investment may be coded to transfer its earnings to the issuer or other account for the period that the draft remains non-negotiable. The system may bring about this result by use of an earnings transfer means that responds to the second media investment generating means for crediting the earnings of the associated first media investment to an account other than that of the investor, for example to an account for the financial institution or issuer when the second media is acquired in response to a first media addition to the investor's account. Thus, the underlying qualified investment pays for the charges relating to the draft system by a limited term transfer of earnings.

A "buy" situation may occur by the transfer of a draft into the investor's account, indicating that the investor has acquired a draft from another customer of the issuer and, additionally, that the investor is keeping the transferred draft, as contrasted to redeeming the draft and making a cash addition to the account. When the system receives a buy order from the transaction entry means, the system employs a differentiating means to determine when the addition to an account is by transfer of a second media investment from another investment account within the system and when the addition to the account is by other than a second media transfer, such as by a cash addition. When the differentiating means determines that the addition is by cash or otherwise is not by transfer of title to an existing draft from another account in the system, the second media investment generating means is responsive to the differentiating means to initiate acquisition of an additional investment in second media, to the extent that the first media investment addition is qualified. Thus, when the addition to an account is by first media investment, the system provides for the possible acquisition of an associated, corresponding second media investment.

On the other hand, when the addition is by a transfer of title to a second media investment into the investor's account from another account in the system, the system will not acquire a corresponding second media investment. Instead, the system utilizes an earnings transfer indicating means that is responsive to the media differentiating means for crediting only the earnings of a newly acquired, corresponding first media investment from the transferee's account into a different account within the system. The transfer of first media earnings may be to the account of the financial institution or issuer for a limited period of time, after which the earnings may accrue to the account of the transferee. Thus, when the addition is by transfer of title to a draft from another account in the system, the system requires acquisition of a first media investment to support the transferred draft and may transfer the earnings of the newly acquired first media investment for a limited period of time.

Two types of investors might be involved in a draft transfer, the first being the normal investor and the second being the special status investor. The latter type is anticipated to be a bank or others who are in banking-related business and thus are relied upon by the issuer to cooperate in liquidating drafts for the normal investor. The special status investor account is identified by a unique type or series of account numbers such that the system recognizes the special status. When the supervisory system receives entry of a buy order together with the identity of a draft to be transferred to the investor's account, the system permits execution of the buy order only with respect to qualified first media investments, as such may be identified in the system data base. In this way, the underlying investment for the draft remains a qualifed investment when a draft transfers between investor accounts. The system may permit the transferee investor to designate the qualified investment, but with a specified qualified investment designated as the default value if a proper qualified investment is not given, such default value being one of the previously mentioned standard investment instructions of the investor account file. The system then may check the transferee investor's account number to determine whether special status has been granted. If so, the system may directly update the draft file and the investor account information for the transfer of the draft and the purchase of the qualified investment, with the result that the special status investor immediately earns full proceeds of the qualified investment and the draft immediately is negotiable according to the account file of the special status investor, thus enabling the special status investor to earn a return on having handled the draft while forwarding the draft to the issuer or holding the draft for resale. However, if the supervisory system determines that the investor is not a special status investor, the draft will be coded in the file as being non-negotiable, and the qualified investment will be coded to transfer earnings to the issuer or other account for the limited term as described above, after which the investor's account is updated to reflect the new first media investment and new draft entry.

"Sell" situations may involve either the liquidation of a first media investment or the redemption of a second media investment. Accordingly, when the transaction generating means has determined that the requested transaction is a "sell" request, the system determines from the entry data and account file which of a draft or a qualified investment is to be sold. If a draft is to be liquidated or deleted from an account file, the qualified investment identification means must assure that a corresponding value of first media investment also is sold to cover the amount of the draft to the issuer. The system may accept a specific instruction from the account holder to liquidate a specific first media investment, or the system may follow a standard instruction in the account file to liquidate a predetermined first media investment. Upon such liquidation, the system shows the sale of the first media investment and the redemption of the draft in the investor account file, and a draft title monitoring means responds to the transaction entry means to show the retirement or change of ownership information relating to the draft. When a draft is transferred to another account holder within the system, the transaction is treated first as a sell order from the first account and next as a buy order to the second account, as described above.

When a sell order relates to a first media investment rather than to a draft, the qualified investment identification means determines from the investor account file whether the investment is qualified and supports an issued draft. The sale of a non-qualified investment immediately is authorized for execution and the account is updated. However, when a qualified investment is to be sold, the second media investment generating means is responsive to the qualified investment identification means, now to determine an appropriate identity and value of issued drafts to be cancelled or held non-negotiable pending cancellation. The system may accept a listing of drafts selected by the account holder, determine the value and negotiability of such drafts from the account file, and cancel such drafts in preference to others, or in default of such selected drafts or if their value is inadequate, the system may select drafts from the account file until a sufficient balance of draft values is identified to meet or exceed the value of the first media investment to be liquidated.

The selected drafts are marked for non-negotiability on the investor account file and any excess value over the value of the first media investment is added to the draft buy balance stored with the account file. Sale of the first media investment is authorized, and the investor account file is updated with a flag showing that the proceeds of the first media investment are to be held by the financial institution until the investor returns the selected drafts to the financial institution or issuer for cancellation. A further entry may be made by the financial institution or issuer when the drafts are received for cancellation to lift the flags on payment of proceeds and reflect on the account file that such drafts are fully cancelled.

With respect to either buy or sell orders, several situations common to brokerage accounts are taken into account by the supervisory system. Certain investments, such as stocks, might be unsuited to be considered fully qualified. In addition, margin loan accounts and lines-of-credit are used to support investments. Any of these types of investments or account features may be considered to be partially qualified investments, capable of supporting the issuance of drafts to a specified percent of the stock or loan value. The system data base may be provided with a file that lists all qualified investments that will be accepted by the system, with each entry having a percent of qualification ranging from zero through one hundred percent. The portion of an investment value that is qualified then can be determined immediately, and the existing investments in investor accounts can be updated by the system to monitor changes in qualified percentage values. Following the system operation as described, partially qualified investments may support drafts in buy or sell situations up to a maximum of the qualified portion of the investment value.

The ability of the supervisory system to permit transfers of drafts between investors and to provide a high degree of security to any transferee may operate by permitting telephonic or other electronic inquiries to be made into the system records from remote locations. Presently known systems allow inquiry into account records by telephone key signals representing an account number and inquiry code or the like. Utilizing such known technique for accepting an inquiry and making a response, the present system may permit remote inquiry into the negotiability of any draft that has been issued, upon the system's receipt of the draft number and, optionally, the investment account in which the draft is recorded and the investor's specific code relevant to that draft. A synthetic voice response may indicate that a draft is negotiable if the draft is shown to be so on the account records, or the response may be that the draft is non-negotiable if, for any reason, the records indicate a problem.

Further, the system may permit remote authorization for transfer of title to a draft, either to another account holder or to a non-holder. Such transfer may require certain security measures, such as receipt of the transferor's confidential code and, in applicable circumstances, the account number and confidential code of the transferee. The transferor may be required to give to the transferee his specific confidential identity code relating to the draft being transferred to enable the transferee to contact the supervisory system, submit the transferor's confidential code as provided, and subsequently create and enter a new code to protect himself against loss of the draft back to the transferor.

When the transfer is to a non-holder of an account with the financial institution, the draft title monitoring means permits the draft to be alienated from the investor's account without alienating the corresponding first media investment from the investor's account. The corresponding portion of the transferor's first media investment may be frozen in the transferor's account, pending redemption of the draft or further transfer of the draft to an account holder with the institution. In the mean time and for a limited time only, such as for no more than three years, the draft title monitoring means may permit the transferor to continue to receive the full or partial earnings of the frozen first media investment, although the system prohibits both the draft and first media investment from being liquidated in response to further orders of the account holder. The financial institution also may receive some or all of the earnings of the frozen first media investment.

The second media portion of the investment account files are accessed for purposes of reporting draft negotiability status. In connection with each draft identification number are stored the account number of the last known holder, or, if appropriate, the fact that the draft is owned by a non-holder of an account; one or more inquiry counters for monitoring the information and transfer requests relating to each draft; and various flag files for indicating any of a variety of limitations on negotiability of the draft. The various counters protect against the use of remote inquiry means by unauthorized persons for improper purposes such as to determine an account holder's confidential identity code or draft identification codes, or to determine the correct account number for a specified draft, or alternatively, to prevent determination of what drafts might be in a specific account. Each type of counter may be set for a different selected limit that, when reached or exceeded, will cause the setting of a flag that causes the system to refuse negotiability or further response, thus preventing the use of the remote inquiry means in connection with the draft until the flag is removed. The various flags may include other indicators such as indicators for lost or stolen drafts, cancellation or redemption of a draft, transfer of a draft to a nonholder of an account, or any other condition that limits free negotiability of the draft on the account record.

When a holder loses a draft, this fact may be reported by coded entry to set an appropriate flag. Lost drafts may be frozen for a term, during which time the earnings of the corresponding first media investment example to cover related costs and liability. Further, the system may provide protection against the holder's combined loss of confidential identity code, draft identity codes, and draft numbers. The system may permit the holder of record to freeze a draft by reporting or reconfirming periodically, such as annually, the loss of such data. Thus, even though the system may receive proper information from a thief to authorize a change of ownership as described below, the draft would remain unredeemable at the financial institution until true ownership is resolved.

Draft transfer requests require that the system access the investor account file for the transferor and, if appropriate, the transferee. The transferor's confidential identity code is required before a remote transfer request is permitted to access the account file, with the transaction being rejected if the account number and code do not properly correspond, in addition to which the inquiry counter will note the rejection. The confidential code of the transferee also may be required and checked against the transferee's account file as a precaution against transfer of a draft into an incorrect account. Whenever errors in draft transfer request cause a draft to be declared non-negotiable for purposes of remote electronic transfer, the system requires that the account holder or other owner personally appear before the issuer or its agent in order to restore negotiability by clearing the flag that is raised in the supervisory system.

The system may protect the investor from abuses of the remote inquiry function by preventing disclosure of the reasons why a draft has been deemed non-negotiable. When a remote inquiry is made concerning a draft that has acquired non-negotiable status, the system may respond to further remote inquiries by reporting the presence of flags as making the draft "non-negotiable", but without a statement of cause. However, the complete list of reasons for non-negotiability may be reported on the investor's periodic statement.

The supervisory system may further monitor the condition and existence of drafts by requiring the holder/investor periodically to confirm that each draft remains in his possession. This might be done by requiring the investor to submit by telephone the confidential code relating to each draft individually. Alternatively, the confirmation might be done by passing each draft through a magnetic reader that confirms the identity of the draft through telephonic communication to the supervisory system. Drafts that are not confirmed by the holder/investor may be deemed lost, but if not made non-negotiable by the investor, will be subject to redemption by anyone appearing to be a holder in due course after a specified term such as three years.

In summary, a draft always will remain redeemable by the original investor, who has proper personal identification as well as the correct draft identification code number. A draft is redeemable by anyone having the correct code number corresponding to the draft, as long as the draft is not flagged nonnegotiable. A draft is redeemable by any holder in due course after a specified term such as three years, if personally presented.

The following examples, which refer to the drawings, will serve to demonstrate the structure and operation of the supervisory system.

EXAMPLE 1

Investor A establishes an investment account with financial institution F and is assigned an investor account number filling a field of a specified number of digits, such as a nine digit field, for example account no. 123456789, and a confidential identification code number filling another field, such as a four digit field, for example identification code no. 9999. As standard investment instructions, the account file lists a money market fund as being the automatic "buy" investment for all cash additions to the account, unless other instructions are given. The same money market fund is identified for any required liquidations. The fund is one hundred percent qualified for bi-media representation, which fact is recorded in a system data base that includes each possible investment handled by institution F, together with a variable, Q, that indicates the percent of qualification of the associated investment.

Figure 1:
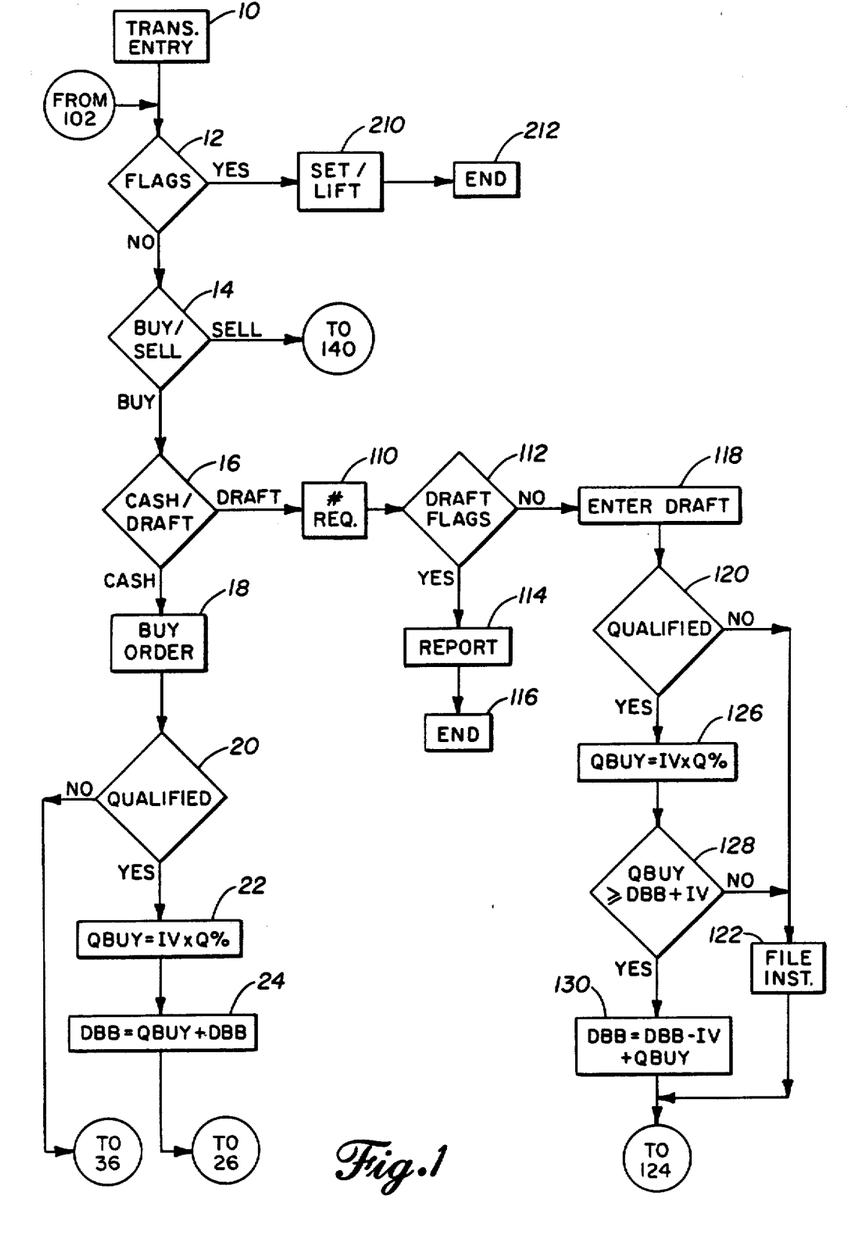
FIGS. 1 and 1A are a schematic flow chart showing the functions performed by the processing system especially with regard to the aquisition of investments to an account.

Investor A adds an initial investment of $100,000 to account 123456789 by cash addition presented to an agent of institution F, who enters the investment via a transaction entry means 10, FIG. 1, instructing the system that the money market fund shares are to be purchased. The transaction entry may be in a format that will be recognized by the supervisory system as including within a pre-established sequence of data fields the investor account number, a transaction code, a value for the transaction, a media identification, and an investment identification. Thus, the entry might appear as 123456789; Buy; $100,000; Cash; Money Market Fund.

Possible entries for the transaction code might include not only the indicated "buy" code, but also a "sell" code and a "flags" code.

The system recognizes at block 12 from the transaction code that the entry does not contain an instruction relating to placing or lifting flags. Consequently, processing advances to an investment transaction generating means at block 14, where the transaction code is recognized to be a "buy" code rather than a "sell" code. Then at the first and second media differentiating means of block 16 the buy order is recognized to relate to a cash addition, or first media buy transaction, rather than to a transferred draft, or second media transaction. At block 18, the transaction generating means authorizes execution of the requested buy order for the amount indicated and for the named investment.

As the system advances to block 20, the qualified investment identification means calls upon the investment file in the system data base and compares the named investment with the listing of investments in order to determine whether a second media investment also is to be authorized. This determination is made by seeking the variable Q in the data base, and determining whether this value is greater than zero. Finding that the money market fund is listed as a 100% qualified investment ($Q=100$), the system advances to block 22, where the variable QBUY is set equal to the product of the investment amount (variable IV, as entered with the transaction), $100,000, times the percentage of qualification, $Q=100\%$, producing a value for the qualified portion of the purchase equal to $100,000. Then, at block 24, the second media investment generating means calls upon the investor's account file, which is a further section of the system data base, to obtain any value of a carried over draft buy balance, variable DBB. This variable is given a new value equal to its old value plus QBUY.

Subsequently, at block 26, the second media investment generating means creates from the available unissued drafts, as listed in a comprehensive draft file within the data base, a variable list file DLIST, containing the identification or serial numbers and values of selected unissued drafts that are within the amount of variable DBB, thus creating a list of drafts that may be issued to investor A as the second media of his money market investment. At block 28, the total value of the file DLIST, which is DT, is compared to the value of DBB to assure that DT is not greater than DBB and thus to prevent drafts from being issued in excess of the authorized draft buy balance DBB. If the variable DT is larger than DBB, the second media investment generating means returns to block 26 to recreate DLIST. If the value of DT is not greater than DBB, the second media investment generating means advances to block 30 and resets variable DBB equal to itself minus DT. For purposes of this example, it may be assumed that for investor A's purchase, DLIST arrived at a listing of one hundred draft numbers, each draft having a face denomination of one thousand dollars. DBB therefore is unchanged from its original value in the account file, which may be assumed initially to have been zero.

Subsequently, the items of the draft list are assigned a confidential code number, specific to each draft, at block 31. The confidential code is to be known by investor A, and, thus, may be established in a predetermined pattern known to investor A by prearrangement at the time the account was opened. For example, the confidential code may be a four digit number representing the sequential position of the draft on investor A's periodic statement of account. Thus, if the drafts presently identified in the draft list are investor A's first drafts, the confidential codes may begin with 0001 and be numbered upwardly to 0100. It may be noted that each draft may have its identification or serial number indicated on its face, but the confidential code number is not available to be read or detected from the draft itself.

Advancing to block 32, the second media investment generating means generates an issue order that authorizes issuer I to issue the contents of DLIST to investor A. An earnings transfer indicating means than creates at block 34 a flag restricting negotiability of the contents of DLIST, together with a flag on the new first media investment indicating that the earning of the investment for a specified period, for example five days, is to be transferred to another specified account of institution F. The specified account may be one from which expenses of institution F and issuer I are paid in relation to the second media investments.

The system advances to block 36, where an updating means updates the account file for investor A to show the new first media investment purchase, including the serial numbers of the drafts that have been issued, the second media investment authorized, and the various flags placed on the first and second media investments. The draft file in the data base is updated to include the appropriate confidential code that has been assigned to each draft newly issued to investor A. The money market fund purchase is noted in the account file to be one hundred percent qualified. The confidential code numbers specific to each draft also are noted in the investor's account file. Finally, at block 38, the system terminates processing for the transaction.

As indicated at block 20 of FIG. 1, if the first media investment had been non-qualified, the qualified investment identification means would have permitted the system to bypass blocks 22–34 and enter the purchase on the account file without special restriction flags and without an indication that the investment was qualified, as no second media investment would have been generated to correspond to the non-qualified first media investment. However, any qualified portion of a first media investment for which second media drafts are not issued is carried over in variable DBB and the first media investment therefore will be flagged and indicated to be qualified at Q% of the investment value IV as shown at block 22. Thus, at block 20, the value of a partially qualified investment may be split according to the value of Q, the percentage of qualification, with the qualified portion being processed through blocks 22–34 as described above.

EXAMPLE 2

Investor A of the previous example is presented with draft number 77-555-3333 having a face denomination of $500.00 by investor B, who also has an account with institution F and who is purchasing goods from A. Investor A uses the remote inquiry service of institution F to determine whether the presented draft is negotiable. Using the key pad of the telephone to enter data after calling a transaction entry telephone number, investor A enters a transaction code, a draft serial number and confidential draft code number, an account number provided by investor B, and a transaction entry symbol such as "#" from the telephone keypad. This data is received as a remote entry at the transaction entry means of block 40 of FIG. 2 and is recognized by the data fields that have been established by the system for such remote entries. The system accesses the draft-related information from the data base account file where the draft is recorded and, at block 42, increases an inquiry counter by one. Then at block 44 the counter total is compared to a preestablished limit for this counter to determine whether a flag should be set on negotiability. Advancing to block 46, the system determines from the entered transaction code whether the inquiry relates to a transfer or to a request for information. In this example the inquiry is for information and the system advances to a negotiability indicating means that starts at block 48 to confirm that the draft is shown to be in the account of investor B as entered in the data field. If the account number and draft identification number do not correspond, the negotiability indicating means branchs to block 50 and requests re-entry of the transaction at block 40. However, if the numbers properly correspond, the negotiability indicating means will advance to block 52 to determine whether any flags are set. If no flags are set, the system advances to block 54, where the draft is reported to be negotiable; while if a flag is set, the negotiability indicatng means advances from block 52 to block 56, where the draft is reported to be non-negotiable. Finally, at block 58 investor B's account file is updated from either block 54 or block 56 to record the inquiry, after which the system terminates processing at block 60.

Figure 2:
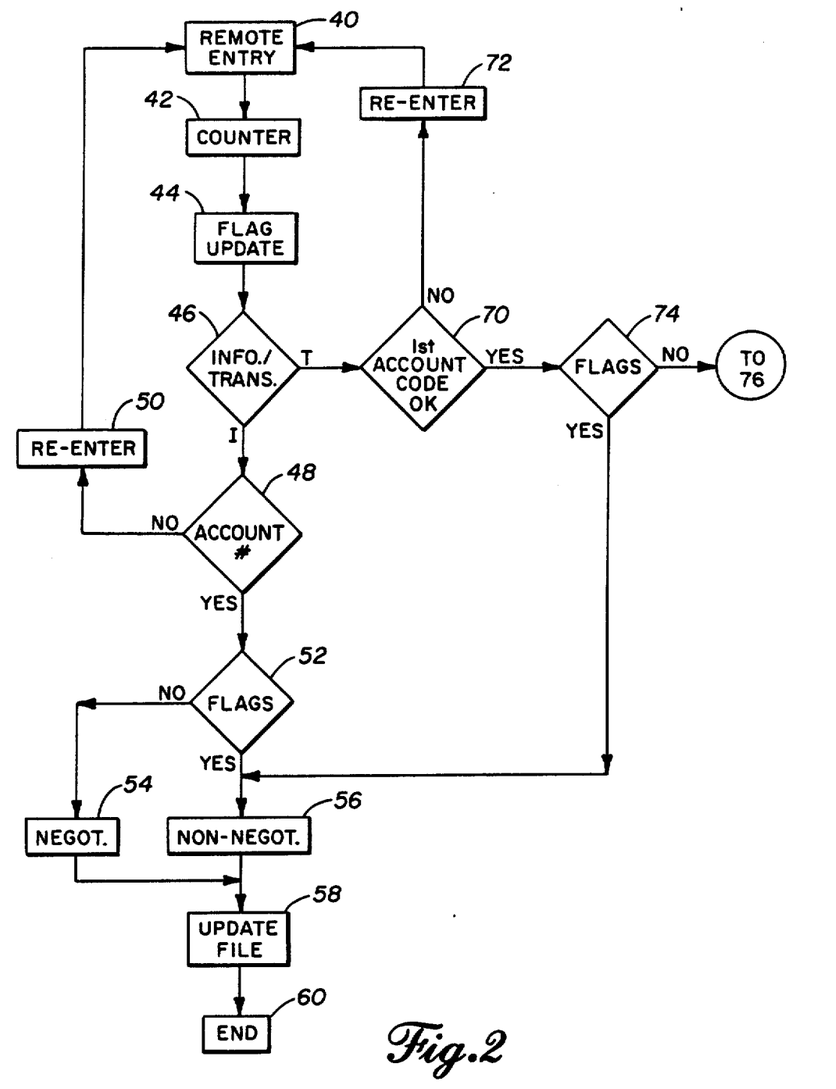
FIGS. 2 and 2A are a schematic flow chart showing the functions performed by the processing system especially with regard to remote or telephone inquiries to the system.

Investor A has received a report that the draft is negotiable as a result of the above inquiry and determines that he will accept the draft and will keep it as an addition to his investment account. Investor A therefore telephones the remote transaction entry number, and he and investor B enter a transaction using the telephone key pad with the following information placed in data fields: a transaction code for transfer, investor B's account number, investor B's confidential personal identification code, draft number 775553333 plus the confidential code corresponding to that draft, investor A's account number, investor A's personal confidential code, and a transaction entry symbol. The system again advances through blocks 40–46 as previously described, now determining at block 46 that the transaction code calls for a transfer of ownership, and therefore the system advances to block 70 where the draft transfer means begins. At block 70, the draft transfer means checks the transferor's account number and confidential code for proper correspondence, any error causing the system to branch to block 72 and request re-entry of the transaction at block 40. If the transferor's account number and code agree, the system advances to block 74 where the negotiability indicatng means checks negotiability of the draft, branching to block 56 to deliver a message that the draft is not negotiable if the file shows a flag, fails to list the draft, or finds that the draft's code number does not correspond to the draft's serial number. However, if block 74 finds the draft to be negotiable, the system reviews the transaction entry at block 76 for an account number and code for a transferee account holder, requesting entry of such account information at block 78 if none was originally provided.

Figure 2A:
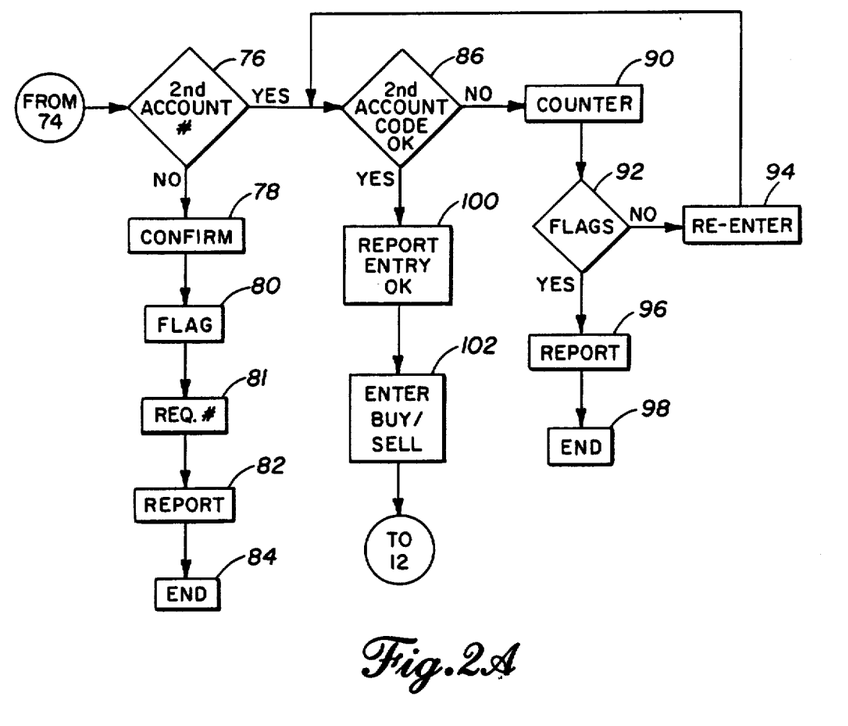

If no transferee account holder is indicated, the transfer is assumed to be to a non-holder, and starting at block 80 the system employs a first and second media title alienation means. At block 80, the transferor's account file is flagged to indicate that the draft is transferred and cannot be liquidated by the transferor, and a corresponding value of first media qualified investment is flagged against liquidation except with the proper transfer or redemption of the draft from the account. In order to protect the transferee against loss of the draft back to the transferor, the draft title monitoring means may request at block 81 that the transferee enter a new confidential draft identification code, which will be recorded in the system even though the identity of the transferee is not known. The transaction is then confirmed at block 82 and processing ends at block 84. In addition, block 82 may include an earnings transfer means that will mark the transferor's account file to transfer earnings of the corresponding first media investment, in part or in full, to investor B, the issuer, or financial institution, for a preselected time period or until the transferred draft is redeemed or returned to an account holder. Thus, investor B might continue to enjoy at least a portion of the earnings of the first media investment even though the title o the corresponding second media investment has been alienated from his portfolio.

The presence of a proper account number and investor's code at block 76 results in the system comparing the number and code at block 86 as a safety measure to assure that the draft is not transferred to an incorrect account. An error results in the system's increasing an error counter at block 90, checking for new flags at block 92, and if none are found, requesting re-entry of the transferee's data at block 94. However, if a new flag is raised at block 92, the transaction is rejected by the system and a report of the transaction is printed to the financial institution at block 96 so that the attempted transaction may be reviewed to determine whether it involves improper activity on the part of the transferor. After printing the report, the system terminates processing at block 98. Proper correspondence between the account number and code at block 86 results in a message being generated at block 100 that the transaction has been accepted, after which the system organizes the entered data and the data from the account files at block 102 to create buy and sell orders for the draft. These orders are sent to block 12 of FIG. 1. Therefore, the properly entered transaction results in a sell order for the draft from investor B's account and a buy order for the draft to investor A's account. Each order is separately handled by processing block 14.

EXAMPLE 3

Following the telephonic transfer described in Example 2, the buy order generated at block 102 for investor A's account is received at block 12, FIG. 1, in a data field format containing investor A's account number, a transaction code indicating a buy order, an investment amount equal to the $500.00 face denomination of the draft, a payment media code indicating payment by draft, and no entry for the investment identification. As previously described, at block 12 the system determines that the transaction does not relate to flags, and at block 14 the system subsequently determines that the transaction code is for a buy order. Then, at block 16, it is determined that payment is by draft, and accordingly the system branches to block 110, where the draft transfer means follows a routine for transferring draft title into an investor account. At block 110, the system requests the draft identification number, which is supplied from the recorded information made by remote entry in Example 2. The draft is reviewed at block 112 to again determine that it is negotiable according to the data base files, with a finding of non-negotiability causing the system to print a report to the account file at block 114 and to terminate processing at block 116. However, with a finding that the draft is negotiable, the sytem advances from block 112 to block 118, where the draft is approved for entry onto the account file of investor A and the draft is assigned a new confidential code, such as 0101.

Figure 1A:
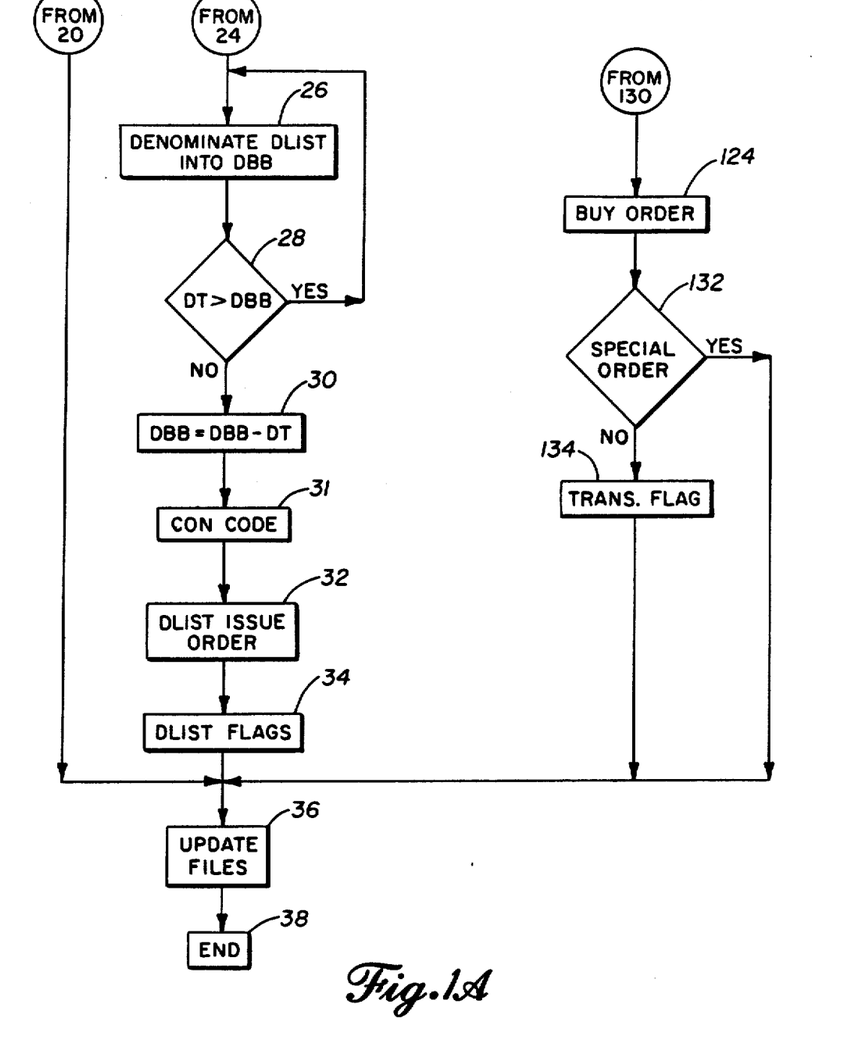

Thereafter, the system branches to a qualified first media investment generating means, which at block 120 reviews the transaction instructions or the presence and identity of a first media instruction. Finding no instruction, or in the alternative finding an instruction to buy a non-qualified first media investment, the qualified first media investment generating means branches to block 122 and reads investor A's account file instruction for purchase of qualified first media investments, finding that purchase of the money market fund is specified. The system then generates an authorization at block 124 for the purchase of the money market fund in an amount equal to the face value of the transferred draft.

If at block 120 the system had determined that the transaction request included a named investment for purchase and that such investment was listed in the data base file of qualified investments, the system would have branched to block 126, where the variable QBUY is set equal in value to the product of the amount of the purchase, IV, times the percentage of qualification for the investment, Q%. Thus, QBUY is set equal to the monetary value of the qualified portion of the requested first media investment. The system then would advance to block 128, where the value of QBUY is compared to the sum of the carried over draft buy balance variable, DBB, plus the value of the investment, IV. If the sum of DBB plus IV is less than or equal to QBUY, the system will proceed to follow the instruction to buy the requested investment, first advancing to block 130 to readjust the value of DBB equal to its prior value reduced by IV and increased by QBUY, and then authorizing the purchase of the named investment at block 124 At block 128, had the value of QBUY been less than the sum of DBB plus IV, the system would have branched to block 122 instead of block 130 and would have followed file instructions for the purchase as previously described.

After the qualified first media purchase has been authorized at block 124, the system determines from the input data whether the account holder has special status at block 132. This determination may be made from recognition of the account number or from an entry in the account file and is relevant to the treatment of certain institutions who cooperate with the system to redeem drafts. Investor A is not such a special status account holder, so the system advances to block 134, where limited term flags are placed on the newly entered draft and on the newly purchased investment, indicating that the draft in non-negotiable for several days, and an earnings transfer means records in the investor account file that the earnings of the investment for the several day period will be transferred to a specified account of institution F, as previously described. The term for earnings transfer may differ from the term under the earnings transfer means of block 34 in recognition that original drafts were not required to be issued in the present transaction and accordingly, the earnings transfer may be to a different account in which issuer I has a different interest. From block 134, or if the account is under special status from block 132, the system advances to block 36 to update the account file and to block 38 to terminate processing of the transaction

EXAMPLE 4

Following the telephonic transfer described in Example 2, the sell order generated for investor B's account at block 102 is received at block 12, FIG. 1, in a format indicating the sale of a draft with $500.00 face denomination. Accordingly, block 12 determines that the transaction code does not relate to flags and processing advances to block 14, where the transaction generating means recognizes a sale, which will be processed by the sales transaction processing means of FIG. 3. Processing branches to block 140 of FIG. 3, where the media identification data field of the transaction is recognized to indicate a draft, or second media. Accordingly, the system follows a draft liquidation means starting with block 142, where the identification number and confidential code of the draft is requested and obtained from prior input data, after which the draft file is checked at block 144 for flags. If a flag is found, a report of the aborted transaction is made at block 146 and processing terminates at block 148.

Figure 3:
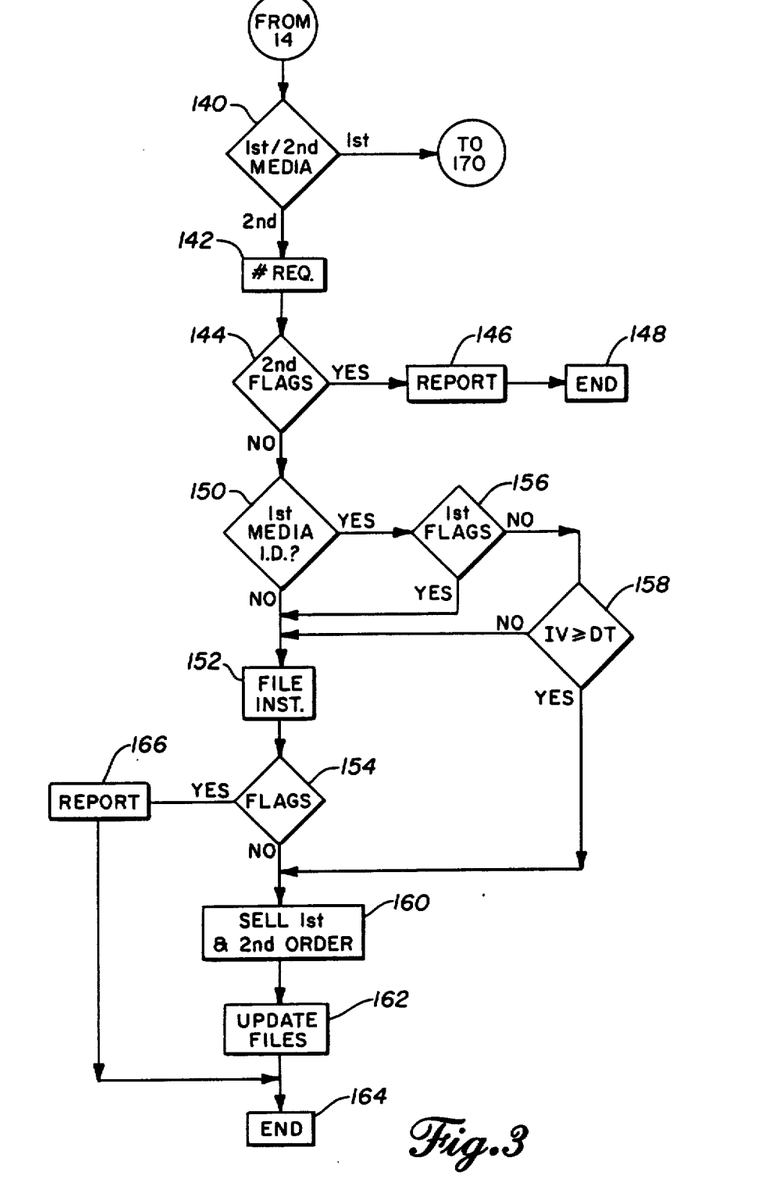
FIGS. 3 and 3A are a schematic flow chart showing the functions performed by the processing system especially with regard to the sale of investments from an account.

If no flag is found, processing advances from block 144 to block 150, where the qualified first media investment identification means examines the transaction data for the identity of a specified first media investment to be sold. None is specified by the telephone transfer transaction, so file instructions for sale are read at block 152 and the indicated investment is checked for flags against sale at block 154. Had a first media investment been identified at block 150, the system would have checked for flags on liquidation at block 156, returning to block 152 if any flags had been found, and if no flag was found, advancing to block 158 to ensure that variable IV, the value of the first media investment, was equal or greater than the value of DT, the total value of drafts being sold from the account. Once again, the system would return to block 152 if the investment had inadequate unflagged value.

From block 158 if the value of variable IV is adequate, or from block 154 if file instructions are followed, the system generates the requested sale orders for both the first and second media investment at block terminating processing at block 164. If at block 154, the investment specified in the file for liquidation had been flagged, the system would have branched to block 166 to file a report to institution F and terminated processing at block 164.

EXAMPLE 5

Investor A wishes to withdraw $10,000.00 from his money market fund with institution F and for this purpose uses a withdrawal request from the investment account. Institution F receives the request unaccompanied by any drafts, and a transaction is entered at FIG. 1, block 10, for the sale of $10,000.00 of the fund. Processing advances through block 12 to block 14, where the transaction generating means recognizes the code to be for a sale. Processing continues to block 140, FIG. 3, where the first and second media differentiating means recognizes that the media code calls for a first media sale. Next, at block 170, FIG. 3A, the qualified investment identification means determines from the account file whether the investment to be sold is qualified, determining in this instance that the investment is qualified. If the investment had not been qualified, a sell order would have been generated at block 172, after which the account file would be updated at block 174 and processing would terminate at block 176.

Figure 3A:
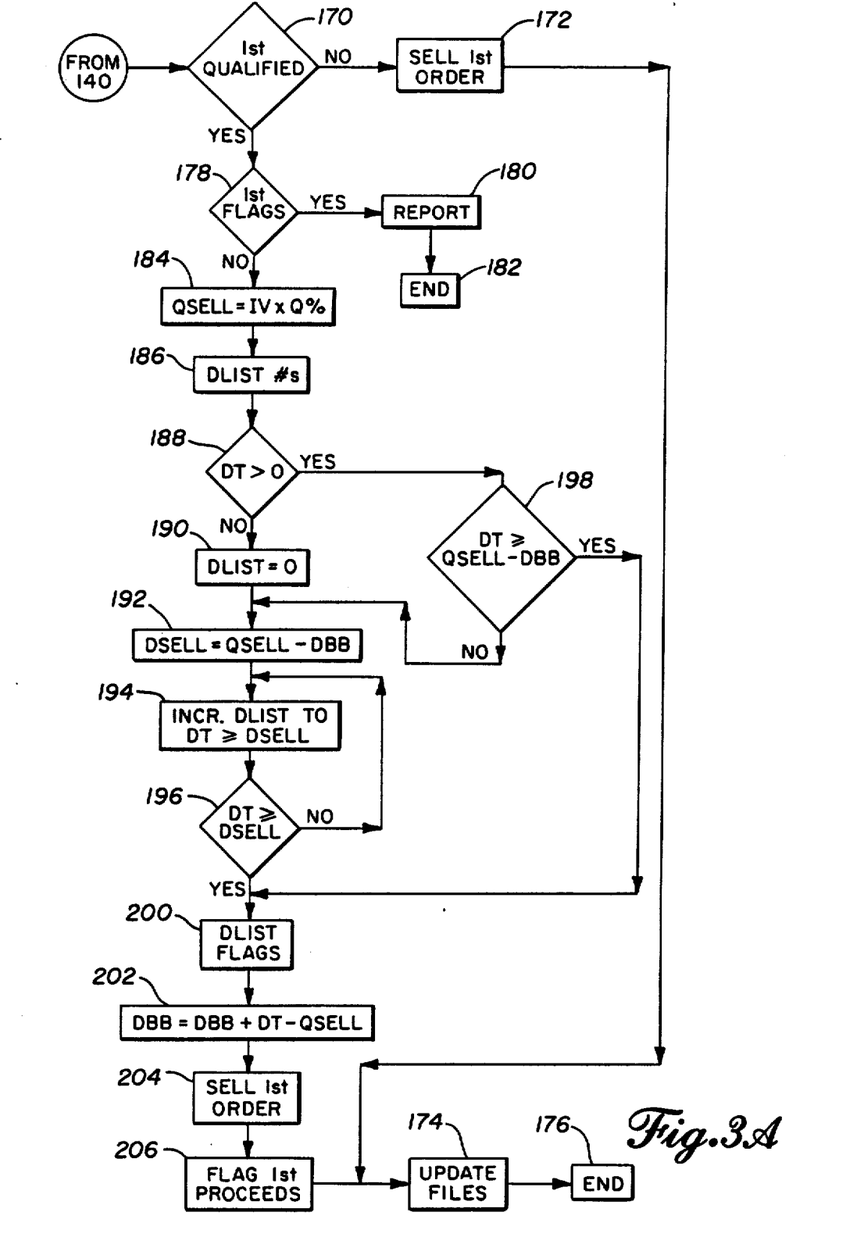

With the recognition of a qualified investment at block 170, the account file is checked for flags against the investment at block 178, with any flags leading to rejection of the transaction and a report being printed to institution F at block 180, followed by termination of the transaction at block 182. If no flags are found, the qualified investment identification means determines the qualified value of the investment to be sold by setting a variable QSELL equal to the total value of the investment to be sold, IV, times the percent of qualification, Q%, taken from the account file, at block 184. Then, at block 186, the second media investment generating means requests input of draft numbers into variable list DLIST, representing the drafts, if any, that have been preselected and turned in to institution F for cancellation in connection with the first media sale.

At block 188, the total value of such drafts, DT, is compared with zero in order to determine whether any such drafts are present. In this instance, no such drafts are present and DT equals zero. Consequently, DLIST is set to zero at block 190 and a variable DSELL, representing the required value of drafts to be cancelled, is set equal to the difference between QSELL minus DBB, the carried over draft buy balance, at block 192. Thereafter, at block 194, variable list DLIST is increased from the available drafts in investor A's account until the total value DT of DLIST is equal to or greater than DSELL. The proper magnitude of DT is confirmed at block 196, with any inadequacy causing the system to loop back to block 194.

If at block 188 the variable DT had been greater than zero, indicating that the variable DLIST contained at least one draft, processing would have branched to block 198, where the value of DT is compared to the difference between QSELL a d DBB, determining whether DLIST contains a sufficient value of drafts to cover the qualified first media sale. If the value is insufficient, processing bypasses block 190 to block 192 to add sufficient drafts to DLIST If the value of DT is sufficient, processing bypasses blocks 190-196.

From either block 196 or block 198, the system places negotiability flags on the drafts of DLIST at block 200, indicating that such drafts have been cancelled. The value of the draft buy balance, DBB, is then reset at block 202 to its last determined value plus DT and minus QSELL. Disposition of $10,000.00 worth of the first media money market fund is then authorized at block 204 and the account file is flagged at block 206 to indicate that the proceeds of sale should be held by institution F until the cancelled drafts are turned in. Processing of the sale is completed at blocks 174 and 176.

EXAMPLE 6

Investor A sends in the listed drafts of DLIST from Example 5 in order to receive the cash proceeds of the $10,000.00 liquidation from the money market fund. Institution F enters a transaction at block 10, FIG. 1, with data fields showing account number 123456789, a transaction code for flags, and follow-up information that flags are to be lifted, with each turned-in draft being listed as the identified investment. The system recognizes at block 12 that the transaction relates to the setting or lifting of flags and advances to block 210, where he indicated instruction is carried out with respect to the specified flag. Processing terminates at block 212.

Thus, as illustrated in the above examples, the processing system for bi-media investments performs a variety of functions that enable an investor to have expanded utility of his investment account. Transactions can be entered by a variety of entry means, including computer terminals and remotely located telephone keypads. The data input to the system from the entry means is recognized by a transaction generating means according to its content and according to pre-established data fields, and the system responds accordingly to generate buy or sell transactions. Importantly, a differentiating means distinguishes between first and second media investments in both buy and sell situations in order to ensure that proper balance is maintained between investments having bi-media representation. Specifically, a qualified investment identification means serves in both buy and sell situations to alert the system to the presence of a transaction involving a qualified investment. Then, a second media investment generating means identifies appropriate quantities and identifies of second media investments to be bought or sold to ensure that a proper balance of first and second media investments is maintained.

Further enhancements include the system's ability to transfer earnings of a first media investment to an account other than the account containing the related second media investment. An earnings transfer indicating means permits an investor to retain benefits of his investments even when he has parted with the related second media investment. Alternatively, earnings may be transferred to other accounts, such as to pay for costs of the system.

Title to the second media drafts is carefully controlled and protected to prevent mistake, theft, seizure, or other loss by the proper account holder, with due regard for the further safety of the draft in the hands of a subsequent holder. Negotiability indicating means permits ready determination of whether any second media draft has proper status to be transferred. A draft transfer means provides a protective routine for transferring draft title either between accounts in the system or to a non-holder of an account. When a draft is being transferred to a non-holder of an account, a first and second media title alienation means permits the holder of the related first media investment or other account holder in the system to continue to benefit from that investment. At the same time, a draft title monitoring means gives the non-holder of an account the opportunity to protect his ownership of a draft by providing in ownership code that will be retained with the draft's identification within the system. When a draft is transferred between accounts within the system, the draft transfer means also provides a new confidential code to the new holder, but, in this instance, the draft also is received in the account of a known holder for further security. In addition, when a draft is received in an account in the system, the media differentiating means activates a means for generating a qualified first media investment, thus ensuring bi-media representation of investments even when the initial inventment is in the second media.

As noted, the media differentiating means also distinguishes between first and second media representations for purposes of selling or transferring investments out of an account in the system. Sales of first media investments are processed by the qualified investment identification means to determine the degree of qualification, and the second media investment generating means then ensures that the necessary corresponding quantity of second media drafts are eliminated from the same account. When drafts are liquidated from an account, the qualified first media investment generating means then serves the additional function of liquidating sufficient qualified first media investment to maintain the necessary balance between the bi-media representation of investments in each account.

The foregoing is considered as illustrative only of the principles of the invention. Further, since numerous modifications and changes will readily occur to those skilled in the art, it is not desired to limit the invention to the exact structure and operation shown and described, and accordingly all suitable modifications and equivalents may be regarded as falling within the scope of the invention as defined by the claims that follow.

The embodiments of the invention in which an exclusive property or privilege is claimed are defined as follows:

1. A system for supervising and processing buy- and sell-investment transactions of bi-media investments in a plurality of investment accounts, wherein a bi-media investment comprises both a first-media-investment of revenue generating character having a predetermined qualified value for bi-media representation, and a second-media-investment of a negotiable draft character, issued by and drawn against a financial institution or associated entity other than the investor, the present and future value of which said system creates, manages, and ensures to be fully supported against the qualified value of the first-media-investment, said system comprising:

a first investment account file containing current information identifying bi-media investments of a first account holder;

transaction entry means for requesting buy-and sell-investment transactions to said first investment account file;

investment-transaction-generating means responsive to the transaction entry means for initiating a requested investment transaction of a first-media-investment in said first investment account file;

qualified-investment-identification means responsive to said transaction entry means for characterizing the requested first-media-investment as to predetermined qualified value;

second-media-investment-generating means responsive to a determination by the qualified-investment-identification means of said predetermined qualified value of the requested first-media-investment for initiating an investment transaction of a second-media-investment of negotiable draft character, issued by and drawn against a financial institution or associated entity other than the investor, the present and further value of which said system creates, manages, and ensures to be fully supported against the qualified value of the first media investment, of a value corresponding to the predetermined qualified value;

means undating the investment account file in response to the qualified-investment-identification means, the investment-transaction-generating means, and the second-media-investment-generating means to show the status of the resulting bi-media investment.

2. The system of claim 1, further comprising:

media-differentiating means responsive to said transaction entry means for differentiating between a requested buy-investment transaction to said first investment account file of a previously issued second-media-investment, versus a required buy-investment transaction to the first investment account file of a first-media-investment; and wherein, when said media-differentiating means determines that a buy-investment transaction is for a first-media-investment, said second-media-investment-generating means is responsive to the media-differentiating means for initiating aquisition of a corresponding second-media-investment.

3. The system of claim 2, further comprising:

earnings-transfer-indicating means responsive to a requested buy-investment transaction of a first-media-investment by said investment-transaction-generating means for crediting the earnings of the requested first-media-investment in said first investment account file to a second investment account file in the system.

4. The system of claim 2, further comprising:

qualified-first-media-investment-generating means responsive to said media differentiating means for initiating a buy-investment transaction of a qualified first-media-investment to said first investment account file, in response to a determination by the media differentiating means that a requested buy-investment transaction is of a previously issued second-media-investment.

5. The system of claim 1, further comprising:

earnings-transfer-indicating means, responsive to a requested buy-investment transaction of a first media investment by said investment-transaction-generating means, and responsive to generation of the requested buy-investment transaction in second-media-investment, for crediting the earnings of the requested first-media-investment to a second investment account file in the system.

6. The system of claim 1, further comprising:

media-differentiating means responsive to said transaction entry means for differentiating between a requested sell-investment transaction to said first investment account file of a second-media-investment without a corresponding buy-investment transaction of the same second-media-investment to a second investment account file, versus a sell-investment transaction from the first investment account file of a first-media-investment without a corresponding buy-investment transaction of the same first-media-investment to a second investment account file; and first- and second-media-title-alienation means responsive to said transaction entry means and responsive to a determination by said media-differentiating means that a requested sell-investment transaction of the second-media-investment has no corresponding buy-investment transaction of the same second-media-investment to a second investment account file, for forbidding liquidation of a qualified-first-media-investment of qualified value corresponding to the value of the second-media-investment until redemption of the second media investment.

7. The system of claim 6, further comprising:

draft-title-monitoring means, responsive to said transaction-entry means for receiving an identity code specific to a secondmedia-investment for which a sell-investment transaction from the first investment account file has been generated without a corresponding buy-investment transaction of the same second-media-investment to a second investment account file.

8. The system of claim 1, wherein:

when a requested sell-investment transaction is of a first-media-investment, said second-media-investment-generating means is responsive to a determination by the qualified-investment-identification means that the first-media-investment of the requested transaction has a qualified value, for indicating to the first investment account file that a second-media-investment, of value corresponding to said qualified value, is non-negotiable.

9. The system of claim 1, further comprising:

media-differentiating means responsive to said transaction entry means for differentiating between a requested buy-investment transaction of a second-media-investment to said first investment account file, versus a requested buy-investment transaction of a first-media-investment to the first investment account file; and qualified-first-media-investment-generating means, responsive to the determination by said media-differentiating means that a requested buy-investment transaction is of a second-media-investment, for initiating a buy-investment transaction of a first-media-investment having qualified value corresponding to the value of the second-media-investment.

10. The system of claim 1, further comprising:

first- and second-media differentiating means responsive to said transaction entry means for differentiating between a requested sell-investment transaction of a second-media-investment from said first investment account file, versus a requested sell-investment transaction of a first-media-investment from the first investment account file; and qualified-first-media-investment-generating means responsive to the determination by said first- and second-media differentiating means that the requested sell-investment transaction is of a second-media-investment from the first investment account file for initiating a sell-investment transaction from the first investment account file of a first-media-investment having predetermined qualified value.

11. The system of claim 1, further comprising:

media-differentiating means responsive to said transaction entry means for differentiating between a requested sell-investment transaction from said first investment account file of a second-media-investment, versus a requested sell-investment transaction from the first investment account file of a first-media-investment; and qualified-first-media-investment-generating means, responsive to said media-differentiating means and to a determination by said qualified-investment-identification means that said first-media-investment of the requested sell-investment transaction has at least a partially qualified value, for initiating a sell-investment transaction of a second-media-investment of value corresponding to said qualified value of the first-media-investment.

* * * * *